US005084708A

United States Patent [19]

Champeau et al.

[11] Patent Number: 5,084,708

[45] Date of Patent: Jan. 28, 1992

[54] POINTING CONTROL FOR ANTENNA SYSTEM WITH ELECTRONIC SCANNNING AND DIGITAL BEAM FORMING

[75] Inventors: André Champeau, Orsay; Serge Maclman, Paris, both of France

[73] Assignee: Thompson - CSF, Puteaux, France

[21] Appl. No.: 567,745

[22] Filed: Aug. 15, 1990

[30] Foreign Application Priority Data

Sep. 1, 1989 [FR] France ............................... 89 11492

[51] Int. Cl.[5] .......................... G01S 3/80; H01Q 3/00

[52] U.S. Cl. .................................... 342/377; 342/375

[58] Field of Search ............... 342/371, 372, 375, 377; 367/123

[56] References Cited

U.S. PATENT DOCUMENTS 4,688,045 8/1987 Knudsen .
4,757,318 7/1988 Pulsifer et al. ...................... 342/375
4,965,602 10/1990 Kahrilas et al. ..................... 342/372

OTHER PUBLICATIONS

Microwave Journal, vol. 30, No. 1, Jan. 1987, pp. 107-123, H. Steyskal, "Digital Beamforming Antennas".

Wissenschaftliche Berichte AEG-Telefunken, vol. 54, No. ½, 1981, pp. 25-43, D. Borgmann, "Steuerung Und Formung Von Strahlungscharakteristiken Mit Gruppenantennen".

*Primary Examiner*—Mark Hellner
*Attorney, Agent, or Firm*—Oblon, Spivak, McClelland, Maier & Neustadt

[57] ABSTRACT

This antenna system has a plurality of elementary antennas configured into an array, wherein there is a reception (or transmission) channel associated with each antenna or sub-array of antennas, said reception channel having, in series:

an active reception module, delay means capable of selectively introducing a pure delay of propagation of the signal picked up by the elementary antenna so as to produce a gradation of delays for the different respective elementary antennas, said gradation of delays enabling the definition of a desired pointing in the direction of the wave to be received with respect to the orientation proper to the array;

and an analog/digital converter receiving, at input, the analog signal received, to deliver, at output, a corresponding digitized signal to a beam forming computer. The delay means are digital means, positioned at output of the analog/digital converter and typically comprise a digitally programmable delay generator comprising a programming input that receives a digital control word, defining the delay to be produced, from a pointing computer, a triggering input that receives pulses digitally representing the signal to be delayed and a signal output deliverying the delayed signal pulses.

4 Claims, 2 Drawing Sheets

FIG_2

POINTING CONTROL FOR ANTENNA SYSTEM WITH ELECTRONIC SCANNNING AND DIGITAL BEAM FORMING

BACKGROUND OF THE INVENTION

1. Field of the Invention

The present invention concerns an antenna system with electronic scanning and digital beam forming and, notably, a way of achieving precise pointing in a wide frequency band, over a very extensive range of angles.

In these antennas, a fixed array of a very great number of elementary antennas is used. Each of these elementary antennas receives (or transmits) an elementary signal, and the combination of the different elementary signals corresponds to the wave to be received (or transmitted).

Electronic scanning consists in receiving (or transmitting) a wave that is not oriented in the same direction as the array, for example a wave with a direction of propagation that forms an elevation angle and/or an azimuth angle with the axis of the array.

To carry out this electronic scanning, it is necessary to apply a temporal or time delay to the signal received (or transmitted) by each of the elementary antennas, this temporal delay corresponding to the increase in the path of propagation introduced by the inclination of the pointing direction with respect to the axis of the array. This is illustrated in FIGS. 1 and 2, where the reference 1 designates each of the elementary antennas, P the plane of the array (for the clarity of the description, it shall be assumed that it is a linear plane array) and P' the plane of the wave to be received or transmitted in the pointing direction $\delta$. It is thus seen that, for each elementary antenna 1, it is necessary to apply a delay $\Delta t_1$, $\Delta t_2 \ldots \Delta t_n$ that is different from one antenna to another.

2. Description of the Prior Art

Essentially two techniques have been proposed to achieve this gradation of temporal delays.

The first technique consists in making an approximation of the delay by phase shifting the received wave.

This technique is easy to implement because it requires only purely electronic means (a phase shifter circuit placed in the active module associated with each of the elementary antennas). Furthermore, the phase shifts can be adjusted swiftly and with adequate quantification.

Despite its flexibility of use, this technique can be used, unfortunately, only for angle variations that are smal relatively to the dimensions of the array (the phase shift is only an approximation of the temporal delay) or for a very narrow frequency band.

In effect, with respect to the latter point, since the phase relationship depends on the frequency, a phenomenon of frequency spread is observed if the operation is outside a narrow frequency band. This phenomenon of frequency spread is similar to that of the chromatic aberrations encountered in optics in the case of Fresnel lenses and prisms for example.

In other words, with pointing done by means of phase shifters, the sensitivity of the pointing to the frequency means that the operation is very soon limited by the very small instantaneous band in which the pointing precision, provided by the number of elements of the antenna and the fineness of control of the phases, is obtained.

This is why, when the spectrum of the operating frequencies of the antenna has to be wide, notably if high resolution in distance is sought, it becomes necessary to abandon the technique of approximation by phase shifting and to introduce a real pure delay.

To implement this second technique of pure delay (to which the system of the invention is related), up till now propagation delay lines have been used. These propagation delay lines are either radioelectric (coaxial lines) or optical (optic fibers, after electro-optical conversion).

Each reception channel thus has a battery of delay lines. For each direction aimed at, a switching is done, for each channel, of that line which makes to possible to obtain the delay corresponding to the gradation of delays.

Since this technique introduces a pure delay and no longer an approximation of a delay, it removes the above-mentioned faults of frequency spread and therefore permits operation over a very wide band and for a large-sized array.

However, it has drawbacks, notably in its practical implementation: in effect, since the procedure is carried out by switching operations, the delay cannot be made to vary continuously, and it is therefore necessary to provide for as many lines as there are discrete directions in which it is sought to point the antenna. This leads to having a total number of delay lines, for the entire array, that is equal to the desired number of discrete pointing directions, multiplied by the number of elementary antennas of the array. It will easily be understood that, for an antenna with high angle resolution, for which it is sought to make maximum use of its potential precision, the number of delay lines needed is prohibitively great.

In addition, the (electrical or optical) switching of the delay lines implies a non-negligible response time that introduces a certain degree of slowness into the "reprogramming" of the antenna array (i.e. the modification of its pointing and of its relationship of illumination).

If a continuous coverage of the pointing directions is desired, the two above-mentioned techniques have to be combined, and the pointing then results from a main pointing (choice of a direction) by pure delay combined with a secondary pointing (fine pointing in the chosen direction) by phase shifter.

However, this combined approach is complicated to make and it is difficult to control the pointing because of the superimposition of two different means, which therefore makes it particularly costly.

One of the aims of the present invention is to propose a new pointing method that overcomes the drawbacks of both of the two above-mentioned techniques while at the same time being very simple and inexpensive to implement, and providing a possibility of varying the pointing direction over a very wide range, almost continuously and without any phenomenon of frequency spread.

SUMMARY OF THE INVENTION

In its principle, the invention is an improvement on the above-mentioned second technique, i.e. an improvement on an antenna system comprising a plurality of elementary antennas configured into an array, wherein there is a reception channel associated with each antenna or sub-array of antennas, said reception channel comprising, in series: an active reception module, delay means capable of selectively introducing a pure delay of propagation of the signal picked up by the elementary antenna so as to produce a gradation of delays for the different respective elementary antennas, said gradation of delays enabling the definition of a desired pointing in the direction of the wave to be received with respect to the orientation proper to the array; and an analog/digital converter receiving, at input, the analog signal received, to deliver, at output, a corresponding digitized signal to a beam forming computer.

The analog/digital converter has an analog signal input, a digitized signal output and a clock signal input receiving a clock signal that controls the instant of sampling of the conversion.

According to the invention, the delay means include a digitally programmable delay generator comprising: a programming input that receives a digital control word, defining the delay to be produced, from a pointing computer; a triggering input that receives the clock signal controlling the instant of sampling of the conversion of the analog/digital converter; and an output signal controlling the clock input of the analog/digital converter, the digitized signal output of the analog/digital computer being applied directly to the corresponding input of the beam forming computer.

The invention is applicable also in the case of an antenna working in transmission mode, for the formation of illumination beams.

In this case, the transmission channel associated with each antenna or sub-array of antennas comprises, in series: a digital/analog converter receiving, at input, from a beam forming computer, the digital signal to be transmitted and delivering, at output, a corresponding analog signal; delay means capable of selectively introducing a pure delay of propagation of the signal to be transmitted by the elementary antenna so as to produce a gradation of delays for the different respective elementary antennas, said gradation enabling the definition of a desired pointing of the direction of the wave to be transmitted with respect to the orientation proper to the array; and an active transmission module.

The digital/analog converter has a digital signal input, an analog signal output and a clock signal input receiving a clock signal that controls the instant of sampling of the conversion.

According to the invention, the delay means include a digitally programmable delay generator having: a programming input that receives a digital control word, defining the delay to be produced, from a pointing computer, a triggering input that receives the clock signal controlling the instant of sampling of the conversion of the digital/analog converter and a signal output controlling the clock input of the digital/analog converter.

Advantageously, whether in reception mode or in transmission mode, in addition to taking the pure delay needed for the pointing into account, the digital control word produced by the pointing computer may also take account of the compensation for the differential pure delays among channels introduced by the differences in length of the respective lines of transmission of the clock signals and/or transmission of the signals picked up by the elementary antennas.

Besides, each channel may also include controlled phase shifter means, capable of selectively introducing a phase delay in the signal picked up and/or transmitted by the elementary antenna, so as to enable a fine adjustment of the pointing defined by the gradation of the pure delays produced by the digital delay means.

BRIEF DESCRIPTION OF THE DRAWINGS

We shall now describe exemplary embodiments of the invention, with reference to the appended drawings in which the same numerical references designate functionally similar elements.

DESCRIPTION OF PREFERRED EMBODIMENTS

In the following description, we shall refer essentially to the example of an antenna system providing for the reception of a radioelectric wave. However, the invention is in no way limited to a reception antenna and, by reciprocity, it applies equally well, mutatis mutandis, to a transmission antenna. The structure of a transmission antenna will be identical to that of a reception antenna with only the direction of the signals being different (i.e., the inputs become outputs and vice versa).

By the same token, for the simplicity of the explanation, the invention shall be described with reference to a linear array. However, this array configuration is in no way restrictive, and the invention can equally well be applied to surface-wave arrays, whether plane or otherwise (conformed arrays) or even to bulk-wave arrays (steric arrays).

In the same way, we shall describe an array having as many reception channels as it has elementary antennas. However, it is possible, in a manner known per se, to combine several elementary antennas with one another so as to set up sub-arrays each associated with its own channel of the system.

Figure 1:
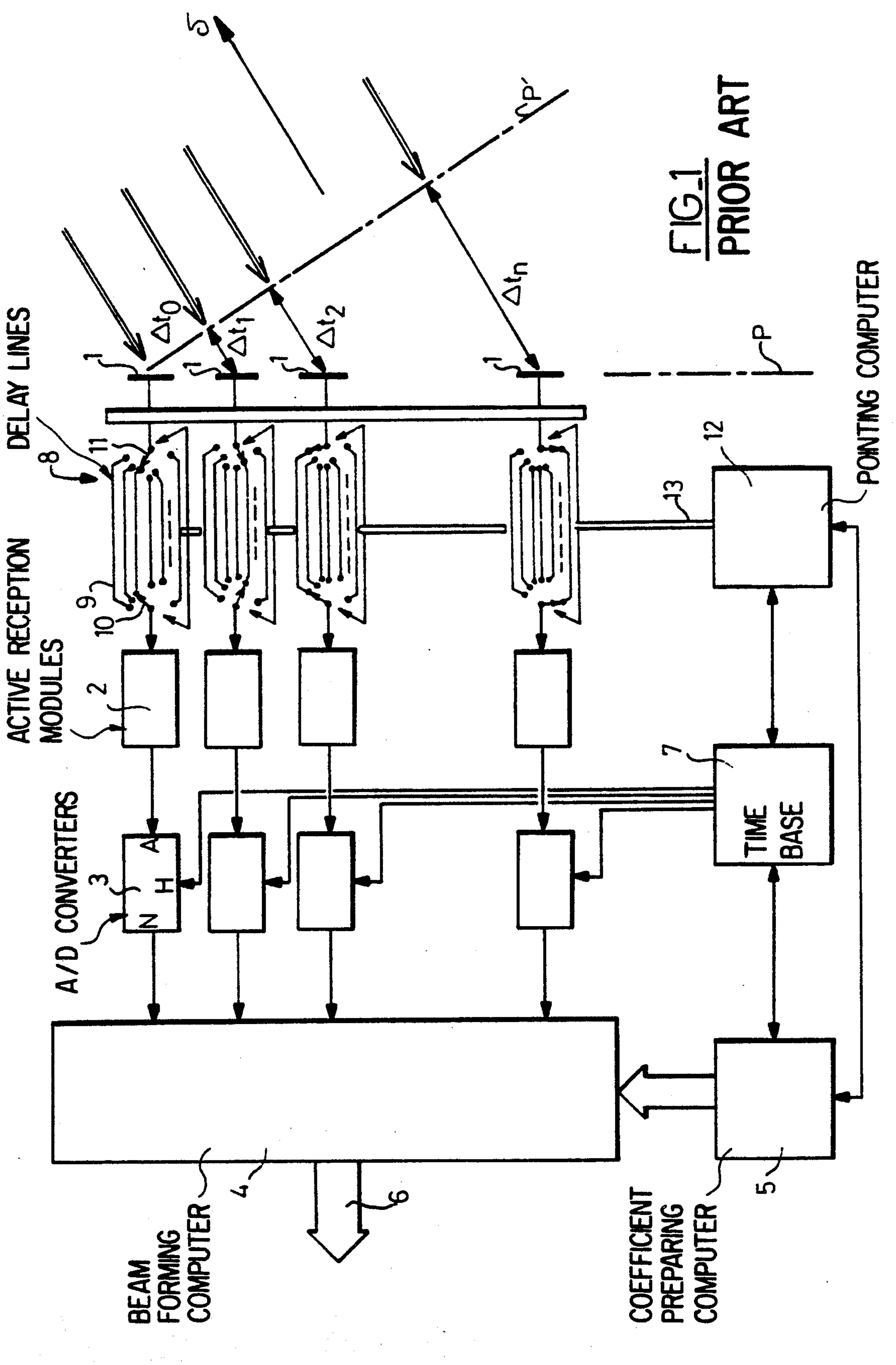
FIG.1 PRIOR ART
FIG. 1 shows a schematic view of an array antenna pointing system of the prior art.

FIG. 1 illustrates the above-mentioned pointing systems with pure delay, used up till now.

The reception channel associated with each elementary antenna 1 has an active reception module 2 and an analog/digital converter 3 delivering the received signals in digital form to a beam forming computer 4. The forming of the beams results from a number of weighting coefficients applied to each of the channels, the different coefficients being produced by a coefficient preparing computer 5 as a function of the desired relationship of illumination.

The weighted sum of the different channels, which therefore corresponds to the received signals processed in the angle range, is transmitted on a bus 6 (or other means of transmission) for analysis in the other axes of processing.

The system also has a time base 7 that generates clock signals applied to the different analog/digital converters 3 (to control the sampling instant of the sample-and-hold circuits of these converters) and a battery of delay lines 8 enabling the desired pure delay of propagation to be introduced into each channel.

More precisely, the battery of delay lines 8 comprises, for each channel, a plurality of (electrical or optical) delay lines 9 selected by change-over switches 10, 11 (diodes or transistors) controlled by a pointing computer 12 through a harness of control lines 13. For each channel, that line is chosen which will enable compensating for the propagation delay $\Delta t_i$ resulting from the difference in orientation between the plane P of the array and the plane P' of the wave to be received.

The same configuration may naturally be used in transmission, the converters 3 then being digital/analog converters, the modules 2 being transmission modules and the pointing direction being the direction of the wave to be transmitted.

Figures 2, 3:
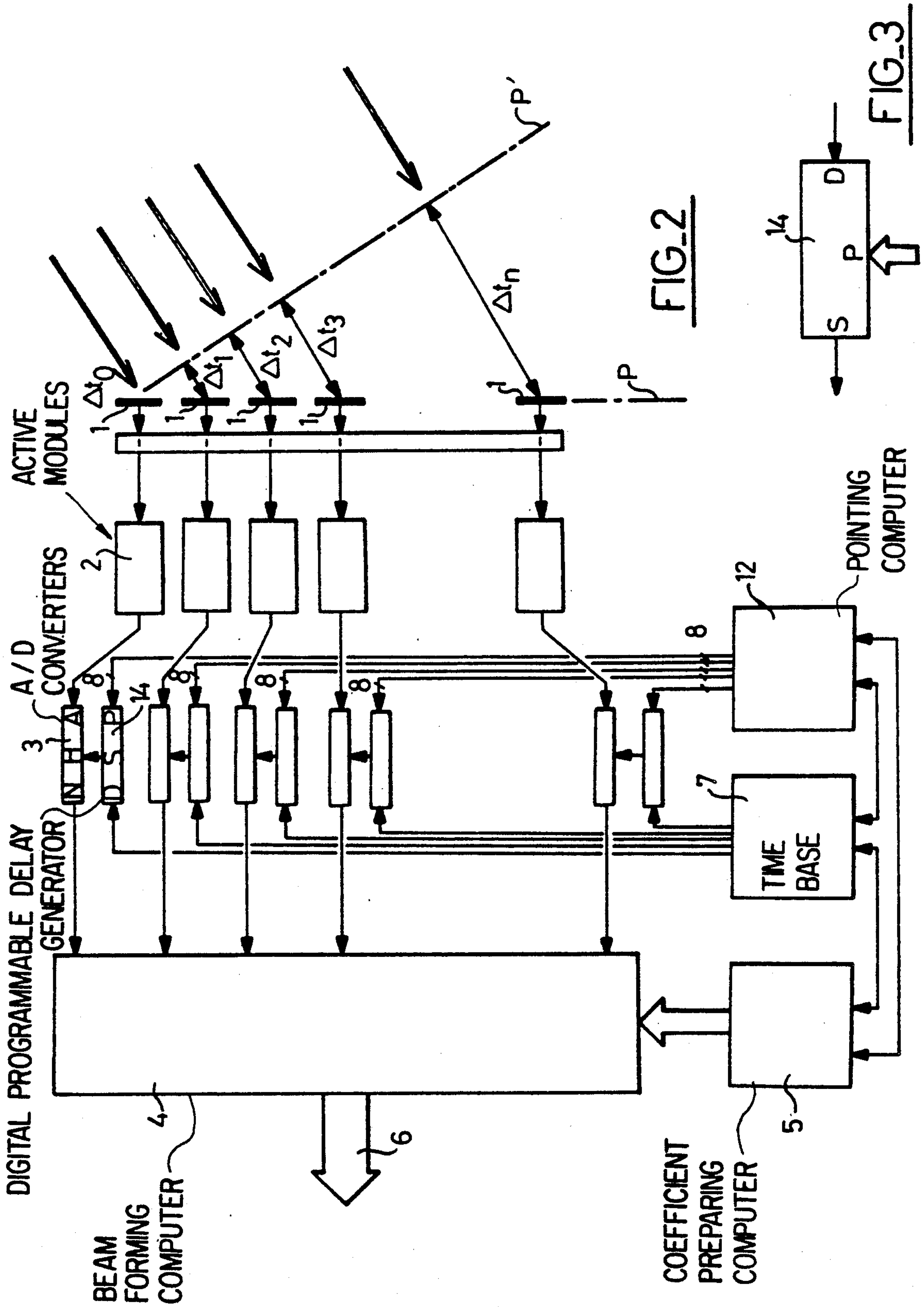
FIG. 2 shows a schematic view, similar to that of FIG. 1, of an array antenna pointing system according to an embodiment of the invention.
FIG. 3 shows the digitally programmable delay generator separately.

FIG. 2 illustrates a mode of implementation of the invention.

As compared with the system of FIG. 1, the batteries of delay lines 8 have been eliminated and the elementary antennas 1 are directly connected to the active modules 2 and to the analog/digital converter 3, i.e. the signal applied to the input A (analog input) of the analog/digital converter 3 is a signal that has no added delay.

The compensation delay will be introduced no longer at the analog circuits, as was the case in the prior art, but downline, at the digital circuits.

In this embodiment, it is the sampling instants of the analog/digital converters 3 that will be delayed, selectively, by a duration corresponding to the time needed for the singals concerned to be propagated in the prismatic space between the plane P' of the wave to be received and the plane P of the sensors of the array.

These delays are very advantageously produced by circuits 14 of the "digitally programmable delay generator" type.

These "digitally programmable delay generators" are circuits that are commonly available in the market and have been proposed, up till now, chiefly for instrumentation (measurement of delays, generators of signals etc.).

As shown in FIG. 3, they essentially have a triggering input D, a delayed signal output S and a programming input P receiving a digital word defining the desired delay.

When a signal pulse is applied to the input D, this pulse is transferred to the output S with a variable delay, as a function of the digital word applied to the input P.

The presently available programmable delay generators have a very wide dynamic range of delay, going typically from some nanoseconds to several hundreds of microseconds, with a resolution of the order of 10 ps.

For a temporal resolution of 10 ps at 1 GHz, an equivalent resolution of the order of three degrees of phase of the wave is obtained, so that the system of the invention enables very fine pointing to be achieved without the use of any additional phase shifter circuit (however, these phase shifter circuits may be provided for if desired, notably to enable fine adjustment of the phase shift relationships within sub-arrays).

The clock signals produced by the time base 7 are thus applied to the triggering input D of the respective delay generators, the clock signal being then transmitted to the input H of the analog/digital converter 3 with a delay, proper to each of the channels, defined by the digital word generated by the pointing computer 12 and applied to the programming input P.

The lines distributing the clock signals from the time base 7 to each of the delay generators 14 may have identical or different lengths. In the latter case, the pointing computer takes account of these differences in length and compensates for them by an appropriate correlative modification of the digital word applied to the input P.

This is also the case for the differences in delay of insertion among receivers or for divergencies in positioning among elementary antennas (typically, in the case of conformed antennas).

This embodiment, wherein action is taken on the clock signals, further has the advantage of providing for action on signals that are produced internally by the time base and are therefore signals having little sensitivity to disturbances and carrying no complex information. Thus (with the exception of jitter or phase noise), there is no degradation observed in the signal-to-noise ratio owing to the insertion of an added delay.

Reciprocally, the principle of the invention is clearly applicable in transmission to the formation of illumination beams, the differential delays being applied at the digital level of the generation of the signals controlling the transmission modules of the elementary antennas.

What is claimed is:

1. An antenna system with electronic scanning and digital beam forming, including a plurality of elementary antennas configured into an array, wherein there is a reception channel associated with each elementary antenna or sub-array of elementary antennas, said reception channel comprising:

an active reception module receiving a signal from said elementary antenna or of sub-array elementary antennas;

an analog/digital converter receiving, at input, an analog signal from the active reception module, and outputting a corresponding digitized signal to a beam forming computer, said analog/digital converter comprising an analog signal input, a digitized signal output, and a clock signal input receiving a clock signal that controls the instant of sampling of the conversion; and a digitally programmable delay generator with a programming input that receives a digital control word from a pointing computer, said word defining a time delay to be produced, a triggering input that receives said clock signal controlling the instant of sampling of the conversion of said analog/digital converter, and a signal output connected to said clock signal input of said analog/digital converter.

2. An antenna system according to claim 1, wherein each channel also includes controlled phase shifter means, for selectively introducing a phase delay in the analog signal, so as to enable a fine adjustment of the time delays produced by the digital delay means.

3. An antenna system with electronic scanning and digital beam forming, including a plurality of elementary antennas configured into an array, wherein there is a transmission channel associated with each elementary antenna or sub-array of elementary antennas, said transmission channel comprising:

a digital/analog converter receiving, at input, from a beam forming computer, a digital signal to be transmitted and delivering, at output, a corresponding analog signal comprising a digital input, an analog signal output, and a clock signal input receiving a clock signal that controls the instant of sampling of the conversion;

an active transmission module receiving the analog signal delivered by said digital/analog converter and delivering a transmitted signal to said elementary antenna or sub-array of elementary antennas; and a digitally programmable delay generator with a programming input that receives a digital control word from a pointing computer, said word defining a time delay to be produced, a triggering input that receives said clock signal controlling the instant of sampling of the conversion of said digital/analog converter, and a signal output connected to said clock signal input of said digital/analog converter.

4. An antenna system according to claim 3, wherein each channel also includes controlled phase shifter means, for selectively introducing a phase delay in the analog signal, so as to enable a fine adjustment of the time delays produced by the digital delay means.

* * * * *

UNITED STATES PATENT AND TRADEMARK OFFICE

CERTIFICATE OF CORRECTION

PATENT NO. : 5,084,708

DATED : January 28, 1992

INVENTOR(S) : Andre Champeau et al.

It is certified that error appears in the above-indentified patent and that said Letters Patent is hereby corrected as shown below:

On the Title page, Item[73], the Assignee should be listed as --Thomson-CSF, Puteaux, France--.

Signed and Sealed this

Twenty-third Day of November, 1993

Attest:

Bruce Lehman

BRUCE LEHMAN

Attesting Officer

*Commissioner of Patents and Trademarks*